(12) United States Patent
Cho et al.

(10) Patent No.: US 6,765,314 B2
(45) Date of Patent: Jul. 20, 2004

(54) POWER MANAGEMENT SYSTEM ASSOCIATED WITH SEMICONDUCTOR MANUFACTURING FACILITIES

(75) Inventors: Jeong Jin Cho, Kyunggi-do (KR); Byung Chan Lee, Kyunggi-do (KR); Chae Hong Lim, Kyunggi-do (KR); Youn Seon Jang, Kyunggi-do (KR); Jun Koo Lee, Kyunggi-do (KR)

(73) Assignee: Samsung Electronics Co., Ltd., Kyunggi-do (KR)

( * ) Notice: Subject to any disclaimer, the term of this patent is extended or adjusted under 35 U.S.C. 154(b) by 153 days.

(21) Appl. No.: 10/040,638

(22) Filed: Jan. 9, 2002

(65) Prior Publication Data

US 2003/0038546 A1 Feb. 27, 2003

(30) Foreign Application Priority Data

Apr. 18, 2001 (KR) .......................................... 2001-20767

(51) Int. Cl.⁷ .................................................. H02J 1/00
(52) U.S. Cl. .................................................... 307/64
(58) Field of Search .............................. 307/44–46, 66, 307/85–86, 96; 361/59, 111, 115

(56) References Cited

U.S. PATENT DOCUMENTS

| | | | | |
|---|---|---|---|---|
| 3,882,380 A | * | 5/1975 | Black ........................ | 324/679 |
| 4,843,533 A | * | 6/1989 | Roof et al. ................. | 363/55 |
| 4,870,528 A | * | 9/1989 | Harford ....................... | 361/56 |
| 4,953,054 A | * | 8/1990 | Fetzer et al. ................. | 361/45 |
| 4,999,728 A | * | 3/1991 | Curl ........................... | 361/33 |
| 5,216,897 A | * | 6/1993 | Tsuchiyama ................. | 62/158 |
| 5,237,480 A | * | 8/1993 | Dara .......................... | 361/42 |
| 5,333,105 A | * | 7/1994 | Fortune .................. | 363/56.11 |
| 5,710,988 A | * | 1/1998 | Suzuki et al. ............. | 455/575.7 |

FOREIGN PATENT DOCUMENTS

| | | |
|---|---|---|
| JP | 54-148220 | 11/1979 |
| JP | 11-178245 | 7/1999 |
| JP | 2000-102195 | 4/2000 |
| KR | 1998-021364 | 6/1998 |
| KR | 2000-20959 | 4/2000 |

* cited by examiner

Primary Examiner—Gregory J. Toatley, Jr.
(74) Attorney, Agent, or Firm—Volentine Francos, PLLC (57) ABSTRACT

A power management system for semiconductor manufacturing prevents malfunctions of loading devices when transient power interruption occurs by maintaining power to the facilities for a period of time after the transient power interruption occurs. The system includes an emergency cutoff circuit, a first power controller, and a second power controller. The emergency cutoff circuit prevents trips in a power relay for one second at the time of transient power interruption. The first power controller discharges a DC voltage for a predetermined time period when AC power is not supplied through a power supply line thereto due to transient power interruption. The second power controller receives the DC voltage provided from the first power controller and discharges the DC voltage during a transient power interruption.

20 Claims, 10 Drawing Sheets

POWER MANAGEMENT SYSTEM ASSOCIATED WITH SEMICONDUCTOR MANUFACTURING FACILITIES

CROSS-REFERENCE TO RELATED APPLICATION

This application relies for priority upon Korean Patent Application No. 2001-20767, filed on Apr. 18, 2001, the entire contents of which are hereby incorporated herein by reference for all purposes as if fully set forth herein.

FIELD OF THE INVENTION

The present invention generally relates to semiconductor manufacturing facilities, and more specifically to a power management system associated with semiconductor manufacturing facilities for preventing operational malfunctions due to transient interruption or suspension of AC power.

BACKGROUND OF THE INVENTION

Transient power interruption, or suspension, may happen from various causes, for example, an unstable power supply environment in a local area, or an intentional severance of a power supply line (or cable) for power maintenance work. When AC power supplied through a power line temporarily goes down to a low level due to such transient power interruption, loading devices or equipment at a consumer's side will malfunction or be out of order.

Several techniques for preventing malfunctions due to a transient power interruption have been disclosed in U.S. Pat. No. 5,216,897, Japanese Patent Publication Heisei 12-102195 and Heisei 11-178245, and Korean Patent Application 1998-021364. In U.S. Pat. No. 5,216,897, applicable to an air conditioning system, circuits reducing delay times by predetermined periods are employed to prevent an abnormal voltage drop due to a simultaneous supply of power to plural air conditioners at a time of power recovery. The Japanese Patent Publication 12-102195 proposes a mechanism for preventing malfunctions in loading devices which raises the voltage of a battery, converts the increased voltage into AC power through an inverter, and then applies the AC power to the loading devices. Meanwhile, the Japanese Patent Publication 11-178245, including a DC link circuit for receiving a DC voltage converted from a converter, a subsidiary condenser, and a switching circuit, controls input/output current operations with the switching circuit in order to prevent malfunctions of loading devices. The Korean Patent Application 1998-021364 prevents malfunctions of loading devices by utilizing a rectifier, a condenser, and a diode, and prevents a voltage drop due to an excessive current flow by blocking a power supply from loading devices consuming a lot of power by means of a reverse-biased diode when the power supply recovers.

A transient power interruption, or suspension, is generally defined as a feature of time that lasts less than 1 second from power shut-off until power recovery. When a time interval without power lasts longer than 1 second, it is regarded as a long-term power interruption, or suspension, that is distinguishable from the transient power interruption, or suspension.

Figure 1:
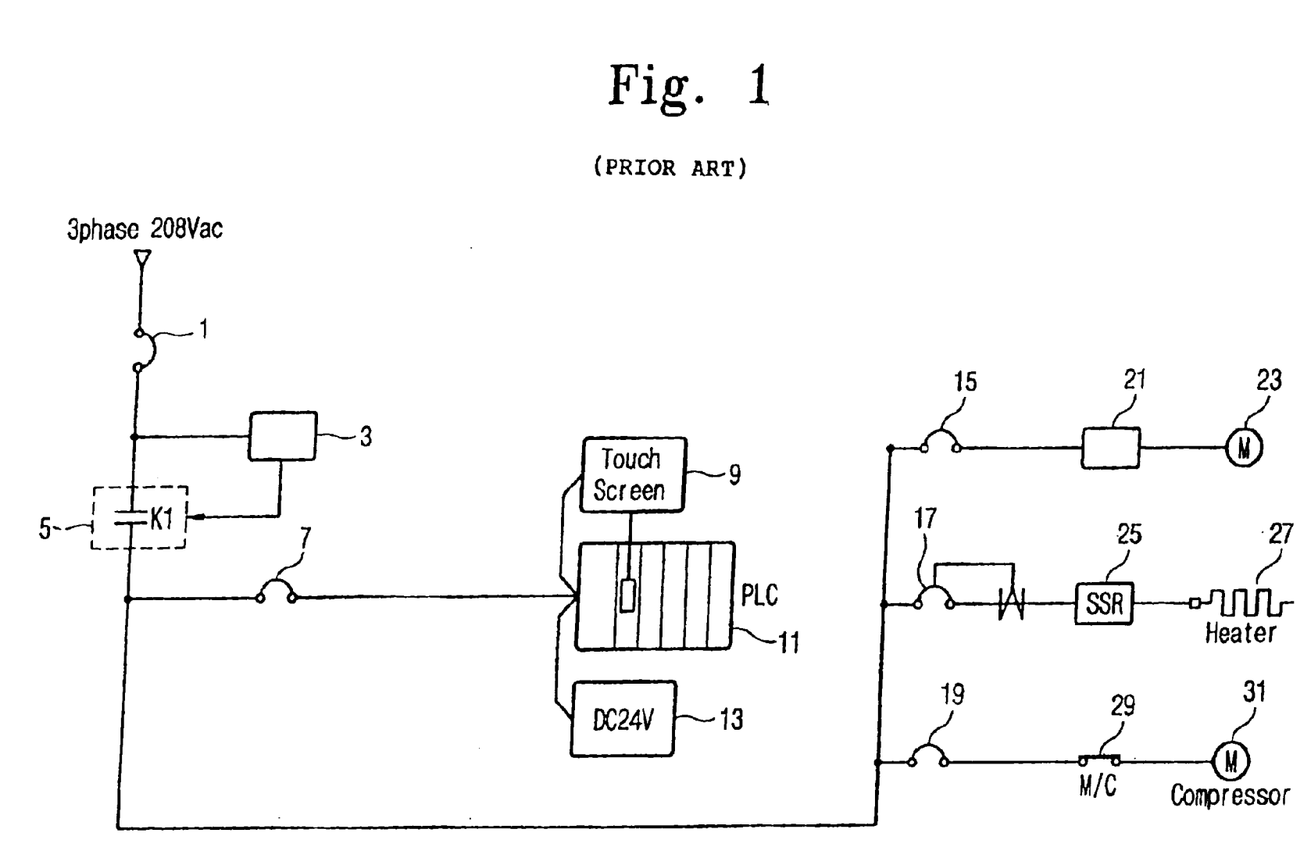
FIG. 1 is a schematic diagram illustrating a construction of a conventional power supply system for a semiconductor manufacturing facilities.

FIG. 1 shows a conventional power supply system for semiconductor manufacturing facilities. The system is operable in 3-phase 208V AC power provided from a power distributor. Referring to FIG. 1, the system includes: a motor 23; an inverter (or a frequency converter) 21 controlling the speed of the motor 23; a heater 27; and a solid-state relay (so-called, SSR) 25 controlling power on/off operations for the heater 27; a compressor 31; cutoff devices 15, 17, and 19, protecting the aforementioned devices from overload, a power relay 5 to cut off the supply of AC power from the distributor; an emergency power cutoff circuit 3; and PLC (programmable logic controller) 11 for controlling the loading devices such as the motor 23, the heater 27, and the compressor 31.

It is required for the power supply system of FIG. 1 to be provided according to a specific design rule in order to be operable in a normal condition even during transient power interruption. For instance, a magnetic contactor (MC, so-called, "power relay") must maintain a turned-on state for 1 second, and all loading control devices (e.g., PLC, and digital meters) must maintain a turned-on state for 1 second. Further, in a main control system for operating peripheral devices cooperated with a reaction chamber in a general semiconductor manufacturing process, a feedback signal for checking an operation status of a chiller must maintain an active state for 1 second. If transient power interruption occurs under insufficient conditions with the necessary design rules, the power relay 5 is tripped open and all the loading control devices are shut down by being situated out of an input power range. Moreover, the feedback signal is disabled at the same time as the devices' shutdown. As a result, the chiller cannot be operable in a normal state, thereby causing an increase in temperature in the reaction chamber and damage to semiconductor products.

Figure 2A:
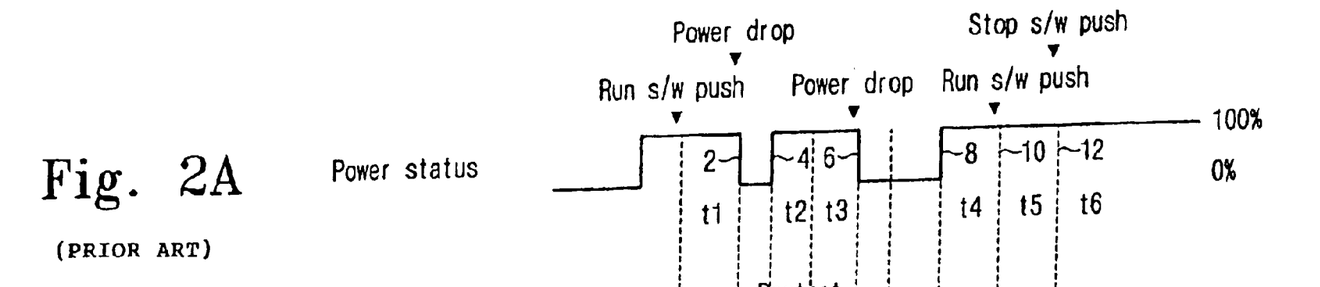
Figures 2B, 2C:
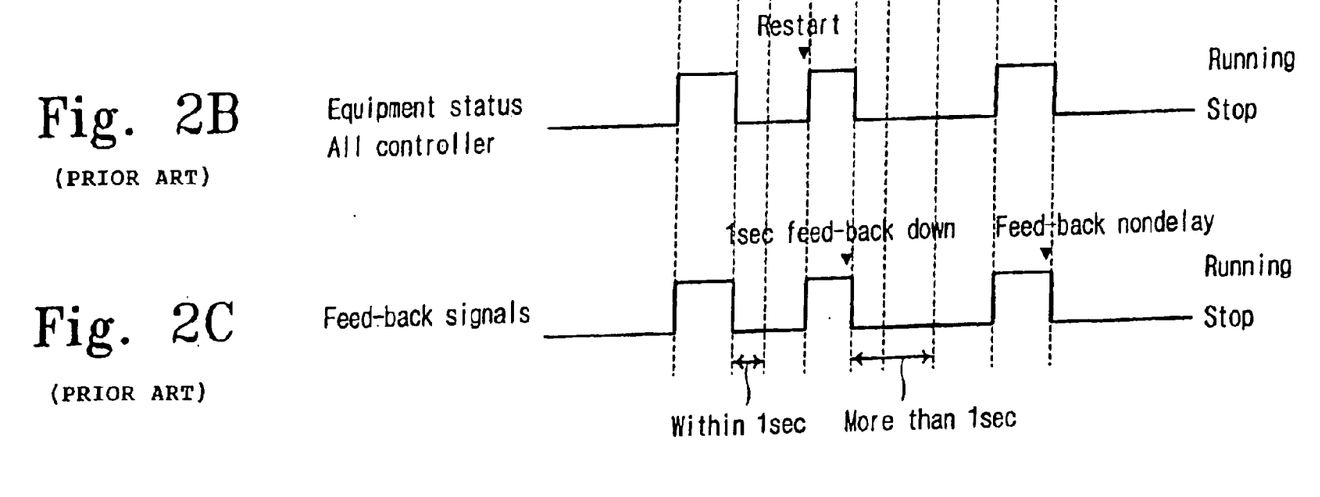

FIGS. 2A, 2B, and 2C shows operational states of the power supply system of FIG. 1, relative to a waveform of AC power transmitted through a power cable, powering states of all the loading control devices, and waveforms of feedback signals transferred to a main control system from a chiller, respectively. While the AC power is 100% fully supplied to the facilities, all loading devices start to be conductive with a run switch turned on. At some time after that, if a power drop (or voltage drop) occurs due to, e.g., an accident at a power transmitter, then the AC power is not further supplied thereto through the power cable, and the power level drops to 0% as shown in FIG. 2A. Then, all the control devices stop their operations as shown in FIG. 2B. Therefore, the feedback signals, as shown in FIG. 2C, for representing current operation states of the chiller are disabled. If the time between power recovery at t2 and the power drop at t1 is less than 1 second, it is a transient power interruption. All operations of the loading devices are shut down during the period of the transient power interruption. Afterwards, when the power recovers and the run switch is turned on, all the devices in the facilities start to operate. On the other hand, the next power drop occurs at t3 and lasts beyond 1 second, that is, it is a long-term power suspension. The loading devices are also shut down. The next power recovery at t4 and the turning-on of run switch at t5 enable the loading devices to be operable. A stop switch at t6 forces termination of work in the overall facilities.

Accordingly, in a semiconductor manufacturing facility, the conventional power supply system is shut down when transient power interruption occurs, which is very disadvantageous in semiconductor manufacturing procedures, causing problems such as an increase of temperature in a reaction chamber due to a disabled chiller, resulting in damage to semiconductor products, and degradation of processing efficiency.

SUMMARY OF THE INVENTION

It is, therefore, an object of the present invention to provide a power management system capable of preventing a shut-off or malfunction of devices in manufacturing facilities even when transient power interruption, or suspension, occurs.

It is another object of the present invention to provide a power management system capable of stabilizing process conditions in semiconductor manufacturing facilities even when transient power interruption occurs.

In order to attain the above objects, according to an embodiment, a power management system includes an emergency cutoff circuit, a first power controller, and a second power controller. The emergency cutoff circuit controls a main power relay in order to maintain a supply of AC power for a predetermined period when transient power interruption, or suspension, occurs. The first power controller is charged up with a DC voltage provided from a rectifier (or a converter), and discharges the DC voltage for a predetermined time when an AC power is not supplied through a power supply line thereto due to transient power interruption. The second power controller receives the DC voltage provided from the first power controller at the first coil and outputs a predetermined operation voltage at the second coil during transient power interruption. The second power controller determines a holdup time (a time that a charge voltage at the first coil reaches the output voltage at the second coil, i.e., a minimum operation voltage) when an AC power supply is shut down due to transient power interruption, using a charge voltage of the first power controller and the DC voltage at the first coil.

A power management system including the emergency cutoff circuit and the first and second power controllers is installed in a chiller of semiconductor manufacturing facilities, as an exemplary practice.

Thus, even while transient power interruption occurs at for example local areas in which power supply condition is unstable, it is possible to secure normal processing operations in a semiconductor manufacturing facilities because process inertia and hold-up times increase through the emergency cutoff circuit and the first and second power controllers.

The foregoing features and advantages of the invention will be more fully described in the accompanying drawings.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar devices, wherein:

FIGS. 2A through 2C are timing diagrams of operations in the system shown in

FIG. 1 when transient power interruption occurs;

The FIGS. 9A through 9D are timing diagrams regarding operations involved in the power management system according to the present invention.

DESCRIPTION OF THE PREFERRED EMBODIMENT

In the following description for purposes of explanation, specific numbers, materials and configurations are set forth in order to provide a thorough understanding of the present invention. However, it will be apparent to one skilled in the art that the present invention may be practiced without the specific details. In other instances, well-known systems are shown in diagrammatic or block diagram form in order not to obscure the present invention. Throughout the following description concerning an embodiment of the invention, "loading devices" means various equipment or devices employed in semiconductor manufacturing facilities, e.g., a motor, a heater, a compressor, a chiller, and so on. Meanwhile, "control devices" means those devices that operate the loading devices.

A power management system disclosed herein prevents a power relay from being tripped (or turning off) and also prevents a shut-down of the facilities by using first and second power controllers in order to secure normal operations of loading devices in a semiconductor manufacturing facility even while transient power interruption occurs. The first and second power controllers cause an operation voltage for the loading devices of the facilities to maintain a minimum operation voltage during the transient power interruption, i.e., for 1 second, increasing a holdup time by means of a capacitance thereof. The power management system may also be applied to a chiller for controlling temperature in a reaction chamber belonging to semiconductor manufacturing facilities, so that the chiller is free from malfunction even when there is no supply of AC power due to the transient power interruption.

Figure 3:
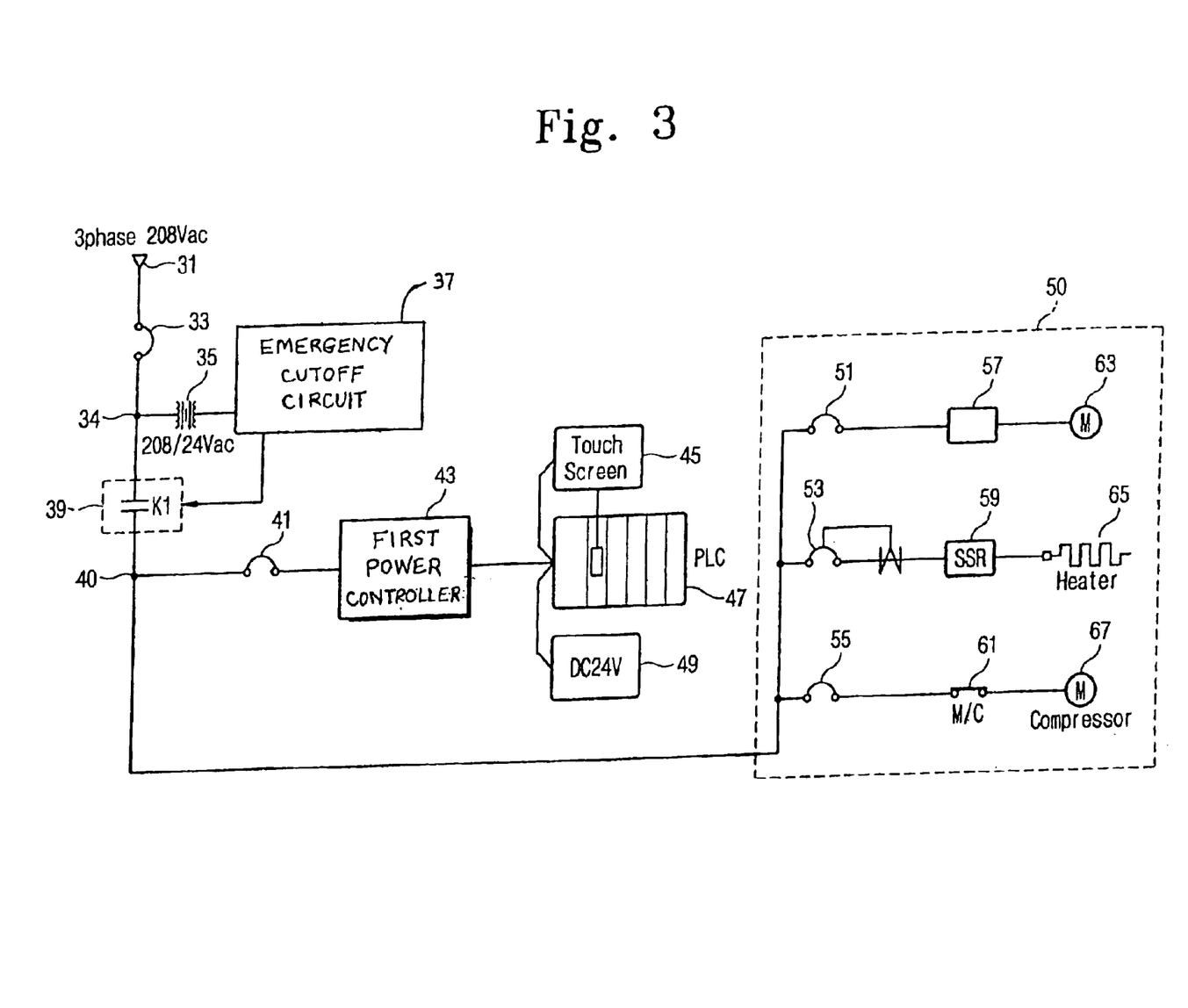
FIG. 3 is a schematic diagram illustrating a construction of a power supply system according to an embodiment of the invention.

FIG. 3 shows a schematic construction of an embodiment of a power management system according to an embodiment of the invention. Referring to FIG. 3, the power management system includes a power distributor 31 for supplying 208V AC power in 3-phase; a magnetic circuit breaker 33 connected between the distributor 31 and a power supply terminal 34; a step-down transformer 35 for reducing the 208V AC power supplied through the magnetic circuit breaker 33 to 24V AC; an emergency cutoff circuit 37 connected to the step-down transformer 35; a power relay (K1) 39 connected to the magnetic circuit breaker 33 through the terminal 34 and responding to an output of the emergency cutoff circuit 37; a (magnetic) circuit breaker 41 connected to the power relay 39 through a power control terminal 40; a first power controller 43 connected to the power relay 39 through the circuit breaker 41; a control device 47 such as a programmable logic controller (PLC) operating loading devices in semiconductor manufacturing facilities; and a second power controller 49 that generates an operation voltage for the loading devices. The control device 47 is also coupled to a touch screen 45 that is also a control device. The circuit breakers 33 and 41 protect the circuit elements from excessive current, and the power relay 39 protects the subsequent circuits when an electrical emergency occurs.

The power control terminal 40 is coupled to a loading block 50 including a motor 63, a heater 65, and a compressor 67. The motor 63 is connected to the power control terminal 40 through an inverter 57 and a circuit breaker 51. The inverter 57 controls a rotation speed of the motor 63. The heater 65 is connected to the power control terminal 40 through a solid-state relay (SSR) 59 and a circuit breaker 53. The SSR controls on/off operations of the heater 65. The compressor 67 is connected to the power control terminal 40 through a magnetic contactor 61 and a circuit breaker 55. The circuit breakers, 51, 53, and 55 protects the loading devices, i.e., the motor 63, the heater 65, and the compressor 67, from excessive current.

The emergency cutoff circuit 37 controls the power relay 39 with AC power supplied through the transformer 35. The first power controller 43 receives an AC voltage of 208V in single-phase and discharges a DC voltage of 280V to the second power controller 49 when transient power interruption occurs. The second power controller 49 receives the DC voltage of 280V provided from the first power controller 43, and then discharges a DC voltage at the time of transient power interruption. The DC voltages from the second power controller 49 range from 5V through 24V that are minimum operation voltages to control the loading devices (the motor 63, the heater 65, and the compressor 67). It is beneficial to employ a switching mode power supply (SMPS) as the second power controller 49, which is disposed in the control device 47 or at the outside thereof.

The power relay 39 maintains a turned-on state for 1 second when transient power interruption occurs, by means of a trip prevention circuit embedded in the emergency cutoff circuit 37. Minimum operation voltages for the loading devices during transient power interruption are retained through DC voltages charged at condensers (or capacitors) of the first power controller 43 and the second power controller 47.

Figure 4:
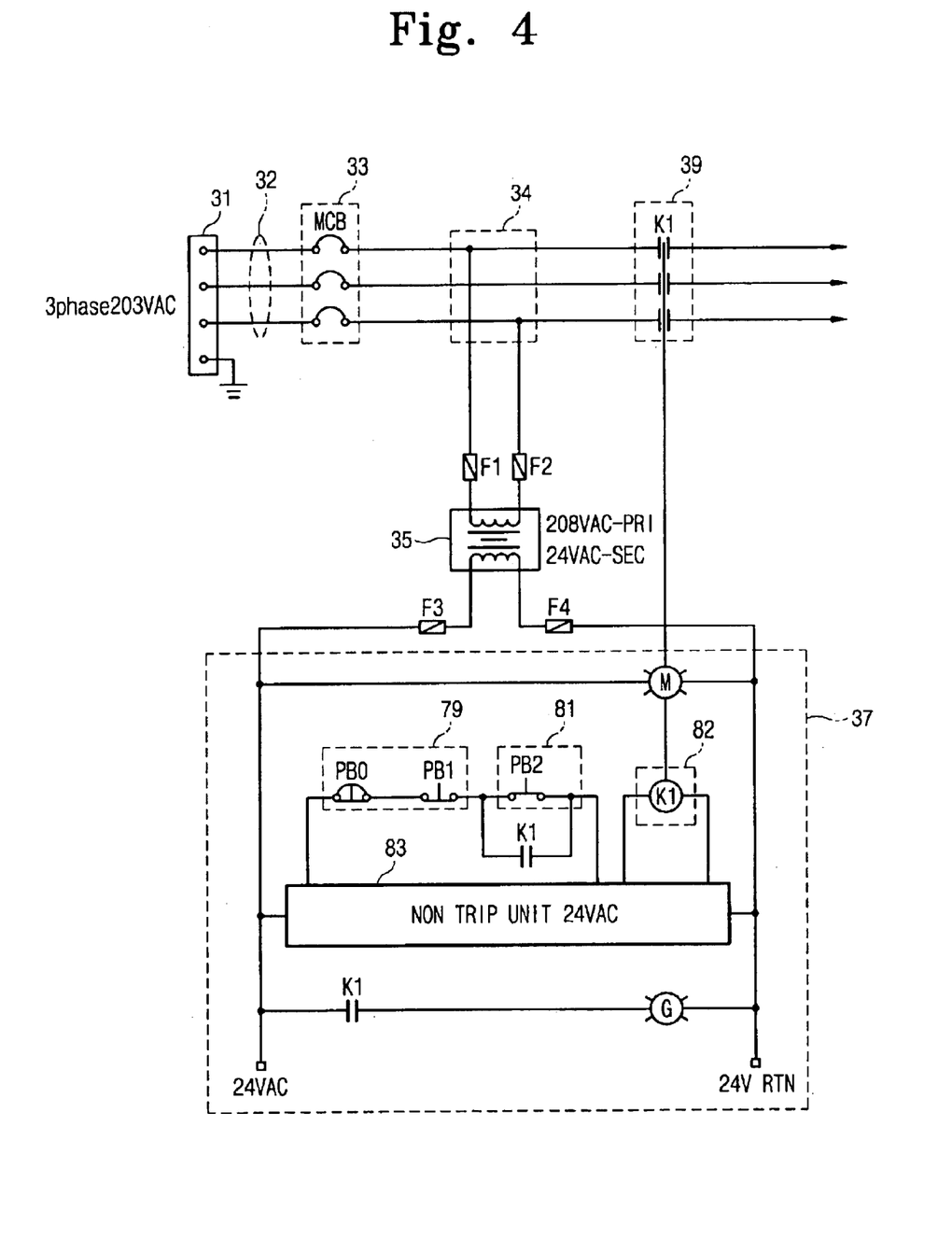
FIG. 4 is a circuit diagram of an emergency cutoff circuit shown in FIG. 3.

FIG. 4 shows a detailed circuit construction of an embodiment of the step-down transformer 35 and the emergency cutoff circuit 37. A magnetic circuit breaker 33 is installed at the power cable 32 at a consumer's side in order to protect the loading devices from being destroyed by an electrical shock such as by lightning. The power relay (K1) 39 is also installed on the power cable 32 to operate an overall power supply for the system. The emergency cutoff circuit 37 conducts with the AC power of 24V provided from the step-down transformer 35 that converts the 208V AC into the 24V AC power. The emergency cutoff circuit 37 includes a trip prevention circuit 83 operable by the 24V AC power, switches 79 and 81 that control the trip prevention circuit 83, and a magnetic contactor 82 to control the power relay 39.

The power relay 39 is designed to be tripped (or turned off) when a power voltage falls down to a predetermined voltage level. For example, if the voltage of the trip prevention circuit 83 goes below 24V, the power relay 39 is turned off. However, the present embodiment forces the power relay 39 to maintain a turned-on state for 1 second by using the trip prevention circuit 83 even while transient power interruption occurs due to an accident at a power transmission site. Such maintenance of the turned-on state of the power relay for 1 second prevents the loading devices from undesirably being inoperable due to transient power interruption, and stabilizes voltage-regulating operations in the first power controller 43 and the second power controller 49.

Figure 5:
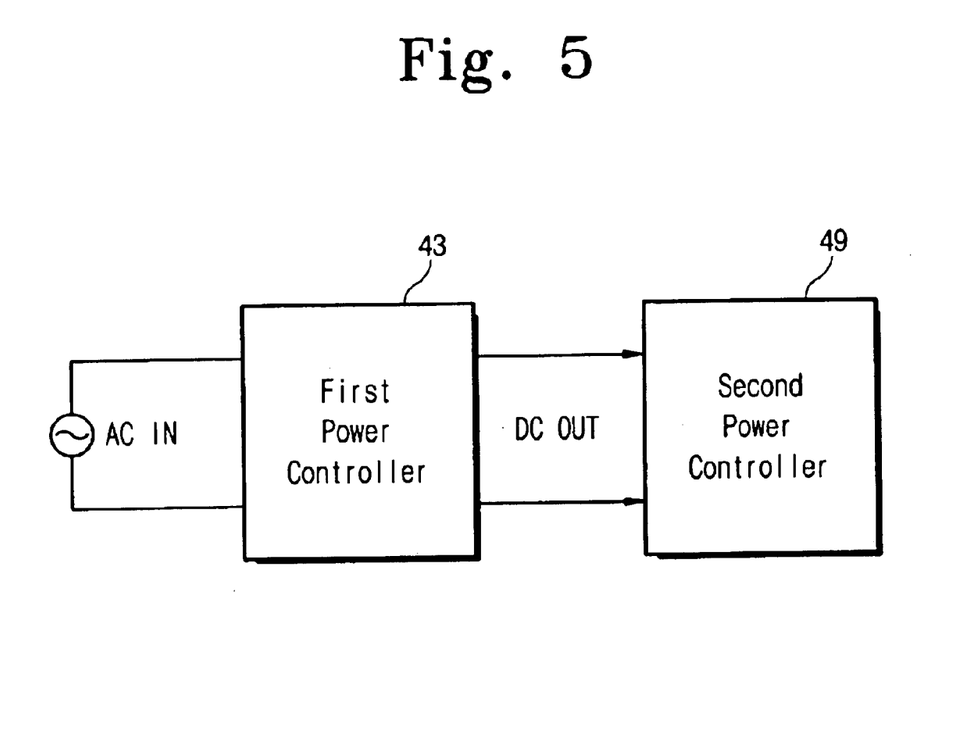
FIG. 5 is a functional schematic diagram of the first and second power controllers shown in FIG. 3.

FIG. 5 shows a functional relationship between the first power controller 43 and the second power controller 49. Referring to FIG. 5, the first power controller 43 produces a 280V DC voltage from the 208V AC voltage, and maintains a power supply state by discharging the 280V DC when transient power interruption occurs. The second power controller 49 generates 5V/24V DC from the 280V DC that is provided by the first power controller 43, and increases a hold-up time for setting the 5V/24V DC by discharging a DC voltage stored on a condenser thereof when transient power interruption occurs.

Figure 6A:
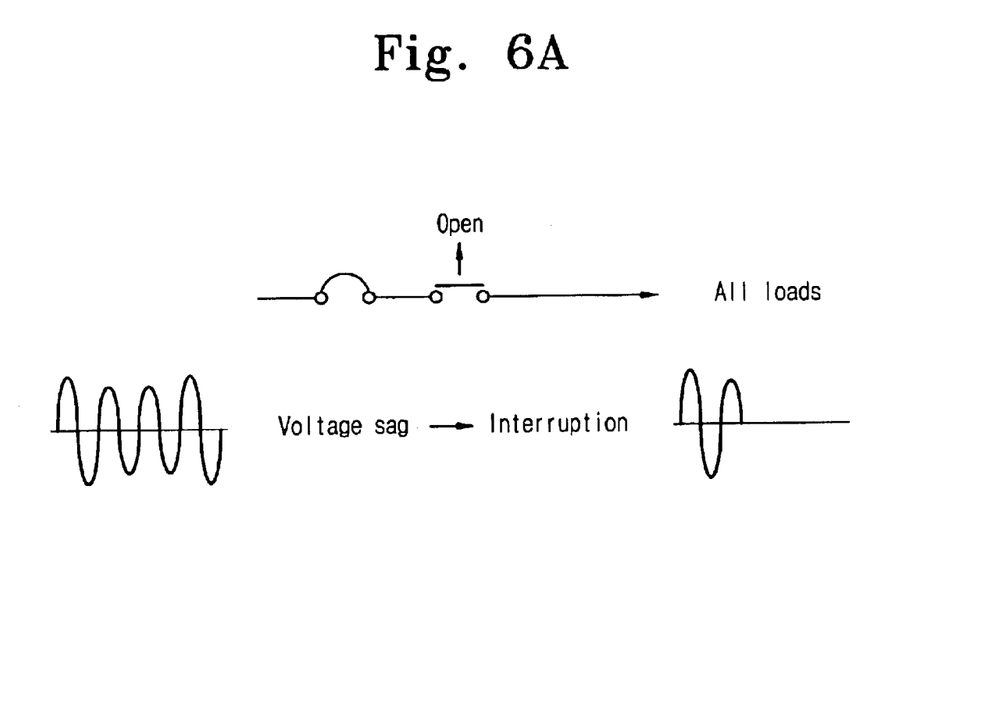
FIGS. 6A and 6B show a comparison of operation concerning all loads in a period of transient power interruption between the conventional art and an embodiment of the present invention.
Figure 6B:
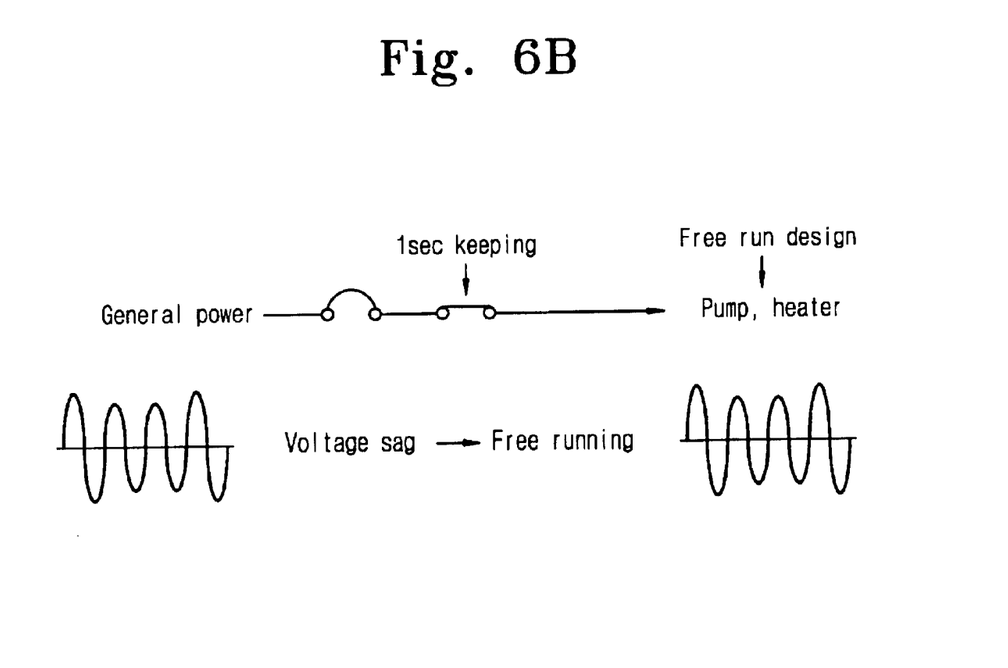

FIG. 6A shows the conventional case in which the power relay 39 is tripped off (or turned off) when transient power interruption occurs. On the other hand, FIG. 6B shows a case in accordance with an embodiment of the present invention wherein the power relay 39 maintains its turned-on state for 1 second even when transient power interruption occurs, which makes the loading devices be conductive without stopping their normal operations and thereby prevents manufacturing facilities from being shut down. Processing inertia may be also enhanced by the maintaining operation for power supply.

Figure 7:
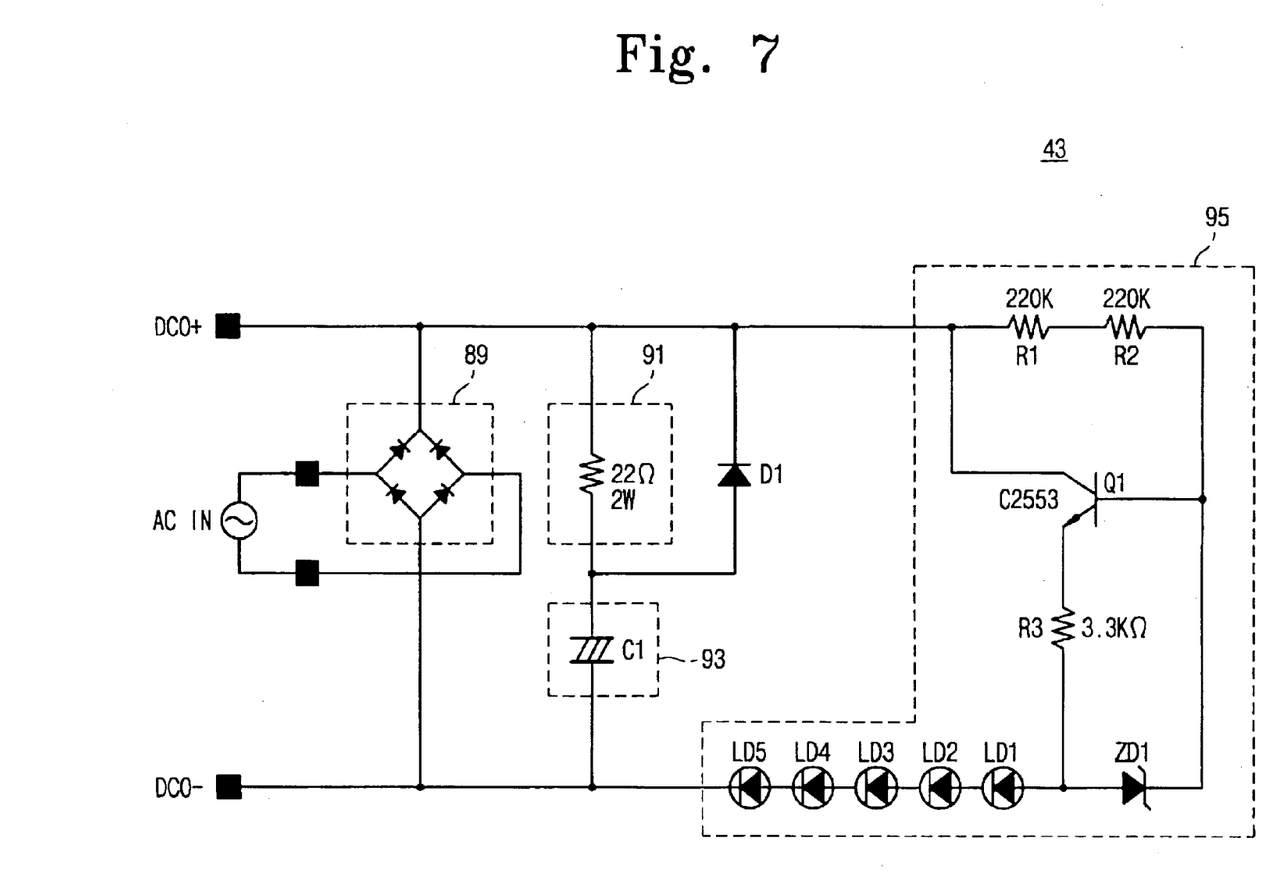
FIG. 7 is a circuit diagram of the first power controller shown in FIG. 3 or 5.

FIG. 7 shows a detailed circuit construction of and embodiment of the first power controller 43 converting the 208V AC power into the 280V DC power. Referring to FIG. 7, the first power controller 43, as a voltage rectifier, includes a rectifier 89 of bridge diodes, a resistor 91, a condenser 93, a diode D1, and a display unit 95. The rectifier 89 converts the 208V AC into 280V DC, being connected between output terminals DCO+/DCO−. The resistor 91 and the condenser 93 are connected in series between output terminals DCO+/DCO−. The condenser 93 is charged with the 280V DC and discharges the 280V DC for a predetermined time (i.e., 1 second) when the AC power is shut down due to transient power interruption. The diode D1 is connected in parallel to the resistor 91 and transfers the charging voltage of the condenser 93 to the DC output terminal DCO+. The display unit 95, including resistors R1~R3, an NPN bipolar transistor Q1, a Zener diode ZD1, and light emission diodes LD1~LD5, represents a current discharge state at the condenser 93.

Figure 8:
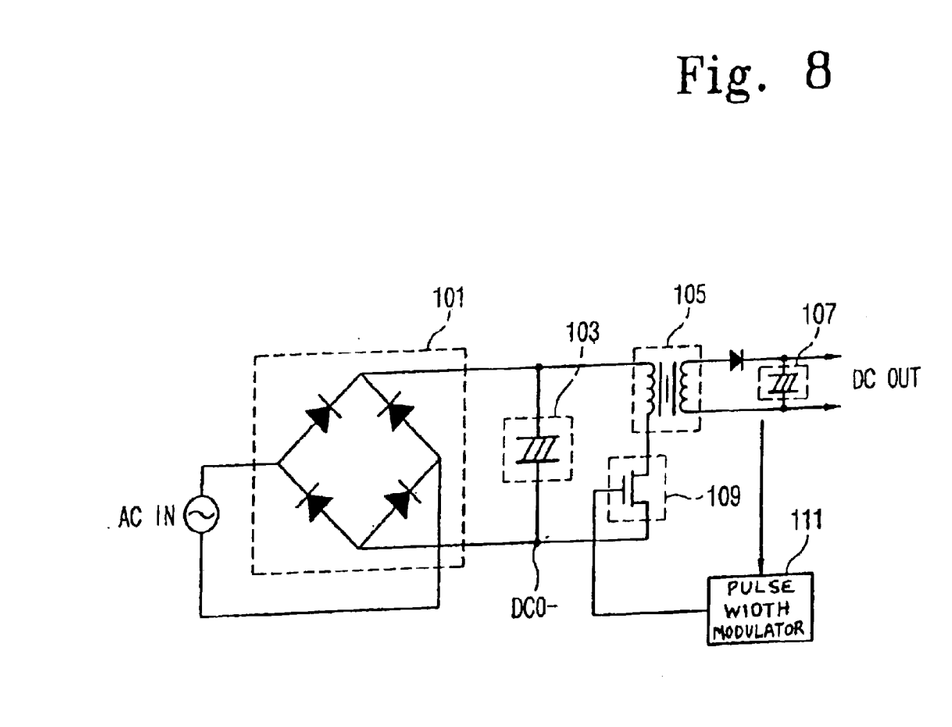
FIG. 8 is a circuit diagram of the second power controller shown in FIG. 3 or 5.

FIG. 8 shows a detailed circuit construction of an embodiment of the second power controller 49 as an example of a SMPS. The SMPS basically functions to receive an AC voltage and to generate a DC power voltage with a switching loop, as is well known. However, the circuit shown in FIG. 8 receives the 280V DC from the first power controller 43 through both terminals (i.e., the DC output terminals DCO+/DCO− of the first power controller 43) connected to a condenser 103 that mostly acts as a charging/discharging element for the 280V DC. Referring to FIG. 8, the second power controller 49 includes a rectifier 101 of bridge diodes, condensers 103 and 107, a step-down transformer 105, a switching device 109, and a pulse width controller 111. The rectifier 101 passes the 280V DC supplied from the first power controller. The condenser 103, being connected in parallel to the rectifier 89 is charged with the 280V DC supplied from the first power controller 43 and discharges the 280V DC when transient power interruption occurs. The step-down transformer 105 converts the 280V DC into 5V/24V DC that are minimum operation voltages for the loading devices. The condenser 107 is charged with the DC voltage of 5V/24V that is established at the second coil of the step-down transformer 105, and discharges the 5V/24V DC when transient power interruption occurs. The switching device 109, made of a MOS (metal-oxide-semiconductor) transistor, is connected between the condenser 103 and the transformer 105 and regulates an output voltage at the second coil of the transformer 105. The pulse width modulator 111 controls a conductive state of the switching device 109 in response to the output voltage of the second coil of the transformer 105. The second power controller 49 increases a hold-up time for establishing the minimum operation voltage DC 5V/24V from the first charging voltage DC 280V, being affected from a discharge time permitted by the first power controller 43.

First, the maximum DC voltage supplied from the rectifier (e.g., 89 in FIG. 7), $V_{DC}$, is:

$$V_{DC} = 2\sqrt{2}\frac{V_{AC}}{\pi}1.54 \,[V] \qquad (1)$$

From the equation (1), it can be calculated that the rectifier generates about 276V DC from 200V AC, or about 138V DC from 100V AC.

Meanwhile, the charging capacity of the condenser (e.g., 93), $Q_c$ is:

$$Q_C = C\frac{V^2}{2} [\text{Wsec}] \qquad (2)$$

An entire backup time available in the condenser can be obtained by subtracting the minimum capacity from the maximum capacity, which is rendered in terms of an overall power consumption of the loading devices A backup time of the control device, for a charging capacity of 1000 µF, is variable in accordance with the various power supply options, as shown in Table 1.

TABLE 1

| Input power option | Input power range | DC supply range | Minimum operation voltage | Backup time per 1000 µF (Power Consumption) | Usable state |
| --- | --- | --- | --- | --- | --- |
| Free volt | 85~264 V AC | 119~264 V DC | 70 V DC | 36.7 Wsec | Possible |
| 100 V AC Only | 85~132 V AC | 110~170 V DC | 70 V DC | 7.35 Wsec | Possible |
| 200 V AC Only | 170~264 V AC | 220~370 V DC | 170 V DC | 24.7 Wsec | Possible |
| Auto change | 85~264 V AC | Impossible | | | Impossible |

The first power controller 43 receives 208V AC in single phase during a normal power supply term. The rectifier 89 converts the 208V AC into 280V DC. At this time, the condenser 93 is charged with the 280V DC. The resistor 91 buffers transient current that violently inflows with large amount enough to affect the condenser. While the first power controller 43 generates the 280V DC during a normal power supply period, transient power interruption causes the condenser 93 to discharge the DC voltage held therein. Current from the condenser 93 is supplied to the output terminal DCO+ through the diode D1. In the display device 95 for showing a discharge state of the condenser 93, the 280V DC is connected to a base of the bipolar transistor Q1 through the resistors R1 and R2. The Zener diode ZD1 permits 10V DC to pass therethrough. The serial-connected LEDs LD1–LD5 are turned off when a residue voltage at the condenser 93 is lower than 10V.

In the second power controller 49, the rectifier 101 passes the 280V DC. The condenser 103 is charged with the 280V DC. The step-down transformer 105 converts the 280V DC that is coupled at the first coil, into 5V/24V DC, as the minimum operation voltage for the loading devices, which is established at the second coil. The condenser 107 is charged with the voltage at the second coil of the step-down transformer 105 and discharges its own voltage held therein when an AC power supply is cut off due to transient power interruption. The pulse width modulator 111 detects the voltage at the second coil of the step-down transformer 105, and then controls an operation of the switching device 109 in order to regulate the voltage at the second coil of the transformer 105 at a stable voltage level. When transient power interruption occurs, the condenser 103 discharges its voltage to the first coil of the transformer 105. Assuming that the second power controller 49 is embodied with a switching mode power supply (SMPS), it is an example to design a voltage input/output pattern of which 208V DC 280V at the first coil as an input terminal of the transformer 105 is converted into 24V DC at the second coil as an output terminal of the transformer 105.

While, during a period of transient power interruption, it is conventional to provide a 10~20 ms holdup time until the minimum operation voltage 24V is generated from the second coil of the transformer 105 after the condenser 103, the holdup time of the present invention is established to be at least over 1 second by means of the first power controller 43 or by adjusting capacity of the condenser 103.

Figures 9A, 9B, 9C:
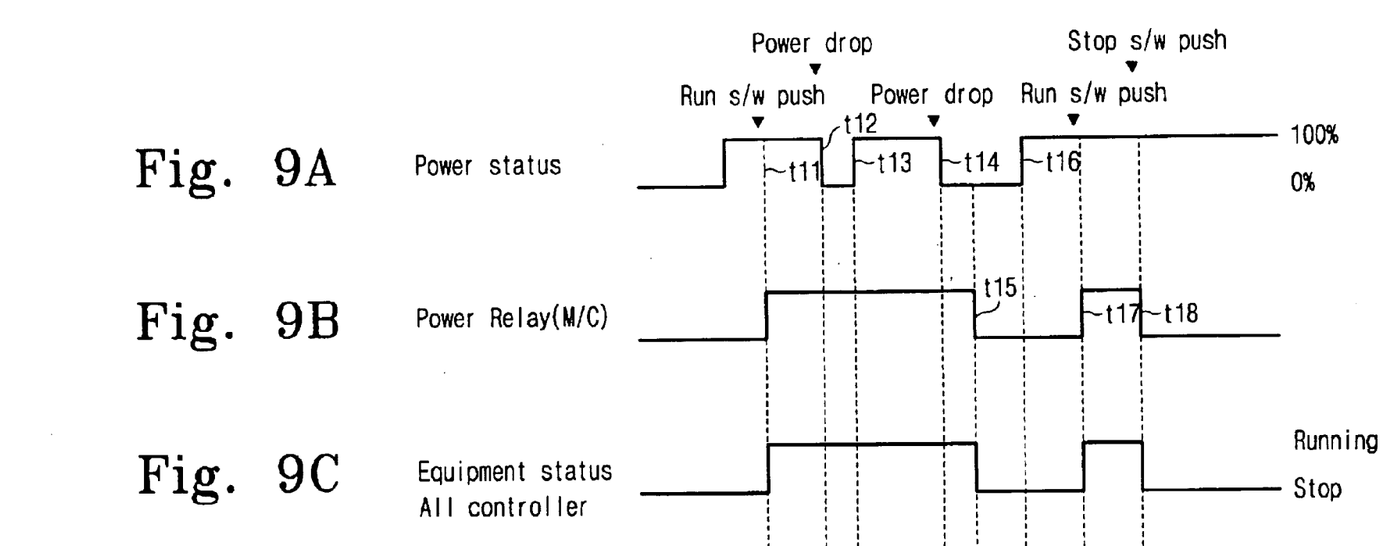

Now, the operation of the above-described power management system will be explained in conjunction with FIGS. 9A through 9D. FIG. 9A shows a waveform of the AC power voltage supplied from a power transmitter outside of the power management system, FIG. 9B shows on/off states of the power relay 39 (a magnetic contactor; M/C) of FIG. 3.

Figure 9D:
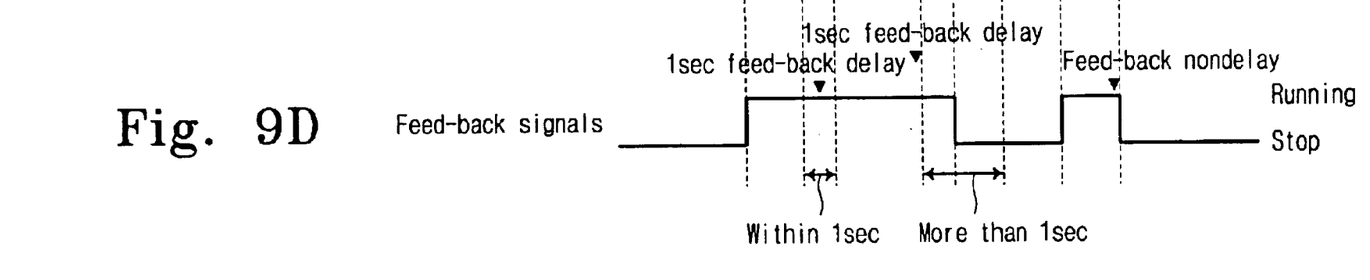

FIG. 9C illustrates operating states for the control and loading devices FIG. 9D shows a waveform of a feedback signal for operation of a chiller during a semiconductor manufacturing process.

Referring to FIGS. 9A through 9D, first, after a run switch is turned on at a time t11, the devices (including the controller, and the loading devices) of the manufacturing facility start to be active. Even if a power drop occurs due to transient power interruption at a time t12, the power relay 39 maintains a turned-on state from the time t12 to a time t13, for 1 second, by the trip prevention circuit employed in the emergency cutoff circuit 37. As shown in FIGS. 9B and 9C, the active maintenance of the power relay 39 for the transient power interruption (that is defined within 1 second) makes all the control devices keep their normal operations without shutting-down due to the transient power interruption. After that, when another power suspension occurs at a time t14 and lasts over 1 second, the power relay and the control devices are turned off at a time t15 after maintaining their active states for 1 second. The reason that the power supply is cut off after 1 second from a power suspension is to prevent damage to the power supply system due to violent current incoming thereto when the power supply recovers.

Table 2 and Table 3, below, show test conditions and results, respectively, for holdup times and minimum operation voltages in accordance with various kinds of the control devices such as a PLC, a touch screen, or digital controllers, with a 300 µF and 280V DC.

TABLE 2

| Type of control device | Model name | Manufacturer | Holdup time | Minimum operation voltage | Power option |
|---|---|---|---|---|---|
| PLC | N70-α | SAMSUNG | 12 sec | 50 V DC | Free voltage |
| Touch screen | V608C | SAMSUNG | 12 sec | 30 V DC | Free voltage |
| Digital controller | FX4S | AUTONICS | 102 sec | 35 V DC | Free voltage |
| Digital controller | E5CS | OMRON | 60 sec | 35 V DC | Free voltage |
| Digital controller | SDC200 | Y-H | 26 sec | 40 V DC | Free voltage |
| Digital controller | SDC40 | Y-H | 21 sec | 55 V DC | Free voltage |

TABLE 3

| Power design condition | Under 1 sec | Over 1 sec | Improvement |
|---|---|---|---|
| State of power relay (magnetic contactor) | Maintain for 1 sec | Tripped after 1 sec | Main power relay (M/C) maintenance circuit (Emergency cutoff circuit) |
| Power state of control device | Maintain for 1 sec | Tripped after 1 sec | Power back-up (First power controller) |
| Feedback status | Maintain for 1 sec | Tripped after 1 sec | Power back-up (Second power controller) |
| Process variation | Normal | Temperature in chamber is increased | Checking after power recovery |

As seen from Tables 2 and 3, according to the test results, the emergency cutoff circuit forces the power relay (made of a magnetic contactor) to maintain a turned-on state for 1 second, so that process inertia of the loading devices (rotation inertia in a pump or a compressor; latent heat in a heater etc.) is enhanced to maintain a normal operation of manufacturing facilities. Thus, the control devices, e.g., PLC, touch screen, or digital controllers, maintain their valid operations for 1 second with a back-up by the 280V DC provided from the first power controller 43 even while transient power interruption occurs. In the test procedure, a practical range of voltage-drop is 10~30%, and the time for reducing the voltage is 100~300 ms. It is possible to conduct a normal operation of manufacturing facilities with 70~90% of normally supplied voltage.

Figure 10:
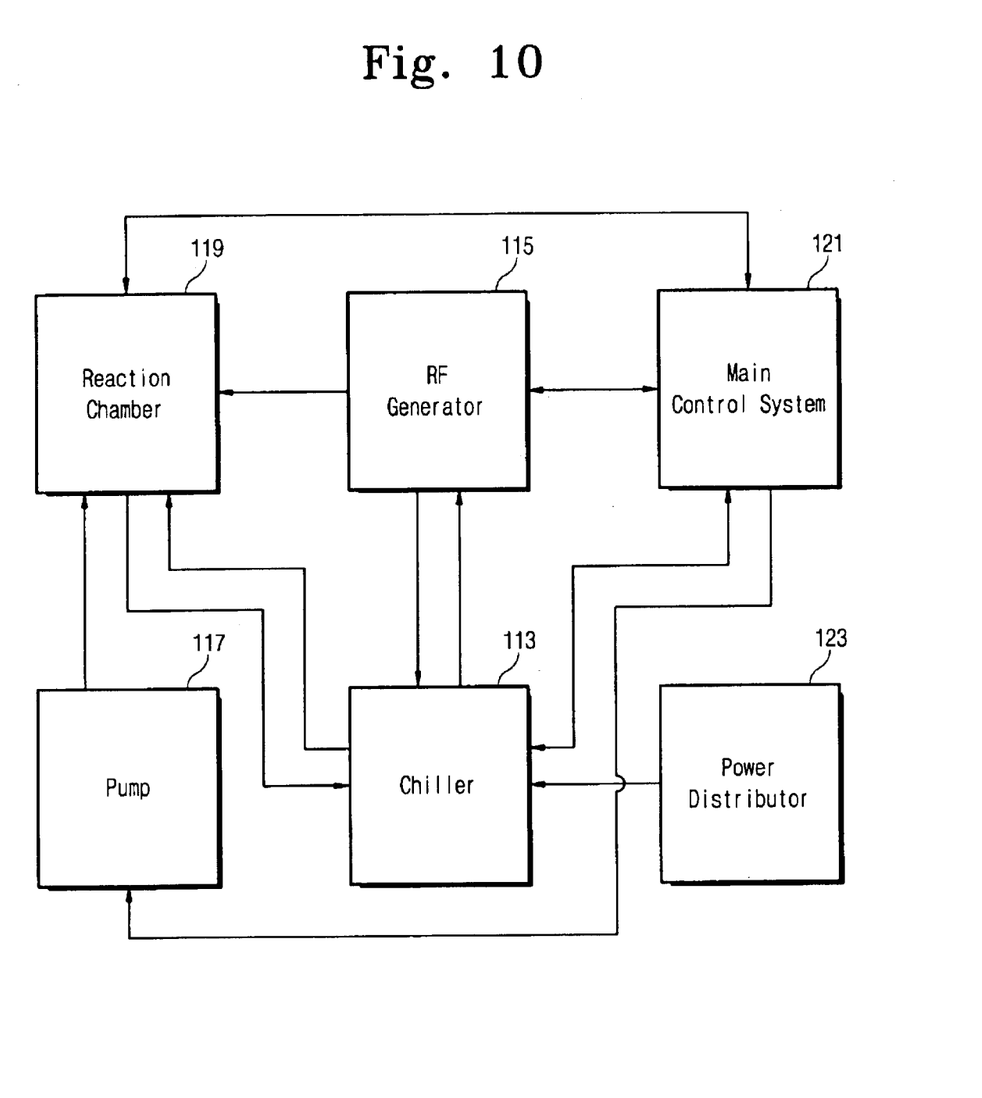
FIG. 10 is a block diagram illustrating an exemplary construction of semiconductor manufacturing facilities associated with an embodiment of the invention.

FIG. 10 shows a functional construction of semiconductor manufacturing facilities, to which the power management system according to the present invention is applicable and maybe associated. It includes a reaction chamber 119, a pump 117 controlling a vacuum state of the reaction chamber 119, an RF (radio frequency) generator 115 supplying RF power to the reaction chamber 119, a chiller 113, a power distributor 123 supplying AC power transferred through a power cable to the chiller 113, and a main control system 121 controlling an overall operation of the facilities. The chiller 113 regulates temperature in a reaction chamber 119 by circulating water for the reaction chamber 119. According to the present invention, the power management system shown in FIG. 3 can be embedded in the chiller 113 and enable the chiller 113 to keep a temperature regulating operation for the reaction chamber 119 even while AC power from the power distributor 109 is being shut down due to transient power interruption.

In addition to the chiller 113, the power management system of the invention may be applicable to a dry pump (e.g., such as the pump 117), a scrubber treating exhaust gas from the reaction chamber, a hot DIN supply system providing hot de-ionized water for an wafer cleaning process, a slurry supply system for a CMP (chemical-mechanical polishing) process, or a temperature/humidity controller for a photolithography process. Moreover, the power management system may be applicable to other manufacturing system subject to a power-supplying state, during a term of transient power interruption, in obtaining a reliable process condition and in preventing an abrupt shutdown of control and loading devices.

As described above, since the power management system prevents malfunctions or shutdown of control and loading devices employed in manufacturing facilities even when transient power interruption occurs, by maintaining a power supply a predetermined time, it is possible to maintain stable process conditions in semiconductor manufacturing facilities even when the transient power interruption occurs.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A power management system receiving AC power to supply a manufacturing facility, the system comprising:
    an emergency cutoff circuit for controlling a power relay selectively connecting the AC power to the facility;
    a first power controller for storing a DC voltage converted from the AC power and for releasing the DC voltage when a transient power interruption occurs; and
    a second power controller for supplying an operation voltage to the facility, the operation voltage responding to the DC voltage provided from the first power controller when the transient power interruption occurs.

2. The power management system of claim 1, wherein the operation voltage is a minimum operation voltage to operate the facility, and the second power controller determines a time period wherein the DC voltage decreases to the minimum operation voltage.

3. The power management system of claim 1, wherein the emergency cutoff circuit comprises a trip prevention circuit for causing the power relay to remain turned-on for a predetermined time period that is corresponds to a time period of the transient power interruption.

4. The power management system of claim 1, wherein the first power controller comprises:

a rectifier for converting the AC power into the DC voltage; and a condenser for storing the DC voltage and for releasing the DC voltage when the transient power interruption occurs.

5. The power management system of claim 4, wherein the first power controller further comprises:

a resistor for buffering an abrupt current increase when the condenser is being charged with the DC voltage;

a diode for transferring the DC voltage from the condenser to an output terminal of the first power controller; and a display circuit for indicating a discharge state of the condenser during the transient power interruption.

6. The power management system of claim 1, wherein the second power controller comprises:

a condenser for storing the DC voltage supplied from the first power controller;

a transformer having first and second coils and converting the DC voltage into the operation voltage; and a switch connected to a terminal of the transformer and responding to a control signal to regulate a voltage on the second coil of the transformer.

7. A power management system employed in a manufacturing system including a first device for performing a predetermined manufacturing process to make a product, and a second device for controlling a specific process condition, the power management system comprising:

an emergency cutoff circuit for controlling a power relay selectively connecting the AC power to the manufacturing system;

a power controller for storing a DC voltage converted from the AC power and for releasing the DC voltage when a transient power interruption occurs; and a control device for operating the second device and for supplying an operation voltage to the second device through a power supply, the power supply converting the DC voltage into an operation voltage for the second device when the transient power interruption occurs.

8. The power management system of claim 7, wherein the operation voltage is a minimum operation voltage to operate the second device, and the power supplies determines a time period wherein the DC voltage decreases to the minimum operation voltage.

9. The power management system of claim 7, wherein the emergency cutoff circuit comprises a trip prevention circuit for causing the power relay to remain turned-on for a predetermined time period that corresponds to a time period of the transient power interruption.

10. The power management system of claim 7, wherein the power controller comprises:

a rectifier for converting the AC power into the DC voltage; and a condenser for storing the DC voltage and for releasing the DC voltage when the transient power interruption occurs.

11. The power management system of claim 10, wherein the power controller further comprises:

a resistor for buffering an abrupt current increase when the condenser is being charged with the DC voltage;

a diode for transferring the DC voltage from the condenser to an output terminal of the power controller; and a display circuit for indicating a discharge state of the condenser during the transient power interruption.

12. The power management system of claim 7, wherein the power supply comprises:

a condenser for storing the DC voltage supplied from the power controller;

a transformer having first and second coils and converting the DC voltage into the operation voltage; and a switch connected to a terminal of the transformer and responding to a control signal to regulate a voltage on the second coil of the transformer.

13. A power management system for a manufacturing facility including a plurality of devices, the system comprising:

a first power controller receiving an AC voltage and generating therefrom a first DC voltage, the first power controller storing the first DC voltage and providing the first DC voltage when a transient power interruption occurs to the AC voltage; and a second power controller receiving the first DC voltage and generating therefrom a second DC voltage, the first power controller storing the second DC voltage and providing the second DC voltage to at least one device in the manufacturing facility when the transient power interruption occurs.

14. The power management system of claim 13, further comprising an emergency cutoff circuit for providing a signal to selectively connect the AC voltage to the first controller, the emergency cutoff circuit including a trip prevention circuit for maintaining a connection of the AC voltage to the first controller for one second when the transient power interruption occurs.

15. The power management system of claim 13, wherein a voltage level of the DC voltage corresponds to a rectified value of a voltage level of the AC voltage.

16. The power management system of claim 13, wherein the first power controller comprises:

converting means for converting the AC voltage to the first DC voltage; and a storage device connected to the converting means and storing the first DC voltage.

17. The power management system of claim 16, wherein the converting means is a diode bridge and the storage device is a condenser.

18. The power management system of claim 16, wherein the first power controller further comprises a display unit connected to the storage device and indicated a discharge state of the storage device.

19. The power management system of claim 13, wherein the second power controller comprises:

converting means for converting the first DC voltage to the second DC voltage; and a storage device connected to the converting means storing the second DC voltage.

20. The power management system of claim 13, wherein the converting means includes a step-down transformer.

* * * * *